United States Patent [19]

Chappelow et al.

[11] 3,874,920

[45] Apr. 1, 1975

[54] BORON SILICIDE METHOD FOR MAKING THERMALLY OXIDIZED BORON DOPED POLY-CRYSTALLINE SILICON HAVING MINIMUM RESISTIVITY

[75] Inventors: Ronald E. Chappelow, Salt Point; Joseph Doulin, Jr., Newburgh; Paul T. Lin, Wappingers Falls; Homi G. Sarkary, Hopewell Junction, all of N.Y.

[73] Assignee: International Business Machines Corporation, Armonk, N.Y.

[22] Filed: June 28, 1973

[21] Appl. No.: 374,426

[52] U.S. Cl. .................. 117/215, 117/106, 117/118, 117/200

[51] Int. Cl. .................. B44d 1/14

[58] Field of Search ........ 117/106 A, 215, 200, 118

[56] References Cited

UNITED STATES PATENTS

| | | | |
|---|---|---|---|
| 3,476,617 | 11/1969 | Robinson | 117/106 A |
| 3,488,712 | 1/1970 | Seiter | 117/106 A |
| 3,558,374 | 1/1971 | Boss et al. | 117/200 |
| 3,765,940 | 10/1973 | Hentzschel | 117/106 A |

*Primary Examiner*—Cameron K. Weiffenbach
*Attorney, Agent, or Firm*—Edward W. Brown; Robert J. Haase

[57] ABSTRACT

A method for the in-situ boron doping of polycrystalline silicon is disclosed wherein the boron-to-silicon ratio is increased beyond the limit of solubility of boron in silicon. Using appropriate flow rates of $SiH_4$, $B_2H_6$, and $H_2$, and deposition temperature, boron rich silicon is deposited upon a substrate. The boron is in solution in the silicon to the limit of its solubility and is present in excess amounts in boron-rich phases believed to be boron silicides. The deposited boron-rich polycrystalline silicon is subjected to a thermal oxidation step during which the dissolved boron is depleted into the growing oxide while the boron-rich phases decompose allowing the freed boron to go into solution in the silicon to replace the boron which is lost to the thermal oxide. By proper selection of parameter values, based upon experimentally determined silicon resistivity-to-$B_2H_6$ flow rate-to-thermal oxidation relationships, the boron-rich phases are substantially eliminated from the polycrystalline silicon at the same time that the thermal oxidation step is completed thereby yielding minimum resistivity doped silicon in the final structure.

5 Claims, 2 Drawing Figures

BORON SILICIDE METHOD FOR MAKING THERMALLY OXIDIZED BORON DOPED POLY-CRYSTALLINE SILICON HAVING MINIMUM RESISTIVITY

BACKGROUND OF THE INVENTION

As is well known, the thermal oxidation of boron doped silicon causes boron depletion to occur in the silicon with the boron tending to concentrate in the growing oxide. The depletion of the boron causes the doping level, and hence the resistivity of the unoxidized silicon, to be influenced. More particularly, as the boron increasingly is depleted from the silicon, the resistivity of the remaining silicon increases.

Typical application of polycrystalline silicon in integrated circuit semiconductor devices require that the polycrystalline silicon be quite heavily doped, i.e., that the electrical resistivity of the polycrystalline be as low as possible. Moreover, the doped polycrystalline silicon typically is subjected to subsequent high temperature operations including thermal oxidation. It will be noted that the aforementioned boron depletion effect which takes place during thermal oxidation is in conflict with the requirement that the remaining polycrystalline silicon be doped to the limit of boron solubility after the oxidation is completed.

SUMMARY OF THE INVENTION

Excess boron, beyond the limit of solubility in polycrystalline silicon, is introduced into the silicon bulk by the in-situ boron doping of polycrystalline silicon while it is being grown at a temperature in the range from about 750°C to about 950°C using hydrogen and gaseous reactants containing boron and silicon. The method causes the localized formation of a distinctly new material, as evidenced by such physical properties as etch rate and resistivity within the silicon bulk. The new material is believed to be one of the boron silicides.

The new material apparently is not wholly stable and converts to ordinary doped polycrystalline silicon at thermal oxidation temperatures in the range from about 800°C to about 1150°C if the solubility of the boron in the silicon is not exceeded. In accordance with the present method, the boron-rich new material within the grown polycrystalline silicon is utilized as an internal source of boron which replenishes the boron (in solution in the silicon) as it becomes depleted by loss to the growing oxide during the thermal oxidation step. By proper selection of empirically determined process parameters the amount of boron remaining in the polycrystalline silicon upon the completion of the thermal oxidation step is substantially at the limit of solubility of boron in silicon so that the thermally oxidized polycrystalline silicon is characterized by minimum resistivity.

DESCRIPTION OF THE PREFERRED EMBODIMENT

Excess boron is added to a growing polycrystalline silicon layer on a suitable substrate, e.g., silicon nitride, to form localized precipitates of a boron-rich silicon compound (apparently a boron silicide) within the silicon bulk, the compound containing more boron than can be dissolved in the silicon. The compound converts to ordinary boron doped silicon at thermal oxidation temperatures thereby acting as a source of boron dopant during thermal oxidation of the doped polycrystalline silicon to replace the boron in solution which is lost to the oxide whereby maximum boron is maintained in solution in the silicon at all times.

A typical process for the in-situ boron doping of polycrystalline silicon comprises the vapor-phase reaction of $SiH_4$, $B_2H_6$ and $H_2$. For example, 5 percent of $SiH_4$ in $N_2$ at a mixture flow rate of 350 cubic centimeters per minute, .05 percent $B_2H_6$ in $H_2$ at a mixture flow rate in the range from about 800 to about 3000 cubic centimeters per minute and $H_2$ at 30 liters per minute reacting in a chamber at about 800°C produce deposited boron doped polycrystalline silicon on a suitable substrate such as silicon nitride. Unlike the case where boron is vapor diffused into a previously provided layer of polycrystalline silicon, where resistivity decreases as the boron concentration in the silicon increases, the above described in-situ doping process produces increasing resistivity as the boron concentration in the silicon increases beyond the solubility limit.

Figure 1:
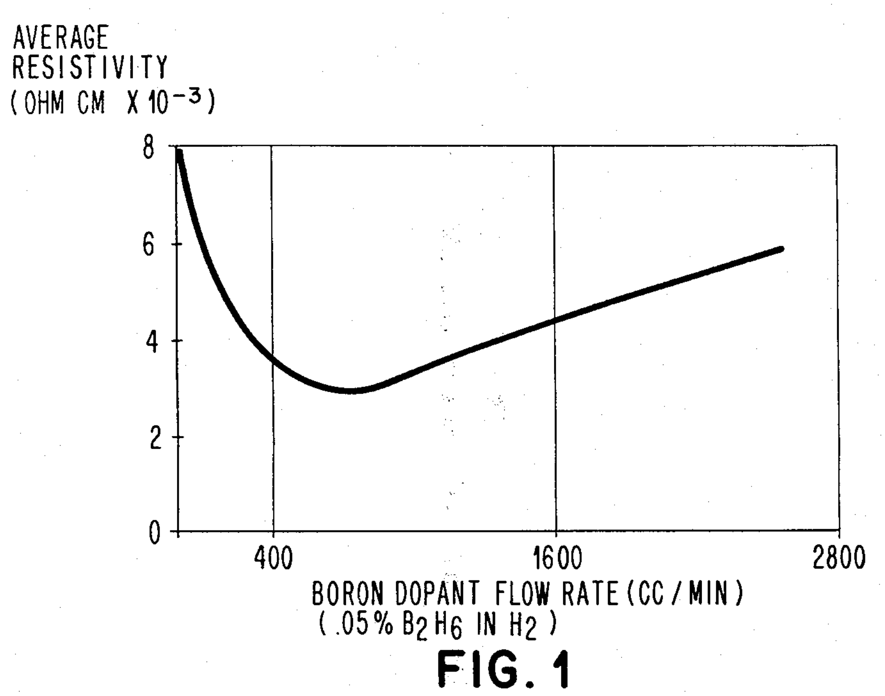
FIG. 1 is a plot showing the relationship between effective silicon resistivity and boron flow rates.

FIG. 1 is a plot of average resistivity of in-situ boron doped polycrystalline silicon samples, each sample being produced in a horizontal pyrolytic deposition apparatus with a different boron concentration in the silicon. More specifically, FIG. 1 shows that the resistivity of the boron doped silicon decreases, as expected, as the boron-to-silicon ratio increases toward 1:18 (corresponding to boron dopant flow rates below about 600 cubic centimeters per minute). Under these conditions, there exists an optimum flow rate of boron dopant (about 600 cc's per minute in the example given) which yields a minimum resistivity in the doped polycrystalline silicon of about $2.5 \times 10^{-3}$ ohm-centimeters. As the boron dopant flow rate is increased beyond about 600 cc's per minute (increasing the boron-to-silicon ratio beyond about 1:18) the resistivity of the polycrystalline silicon has been found to increase as shown in FIG. 1. It is thought that one of the boron silicides begins to form at the relatively high boron-to-silicon ratios and that this relatively insulating phase is responsible for the increased resistivity values.

Experimental evidence has been obtained using boron doped polycrystalline silicon samples produced using boron dopant flow rates below about 600 cc's per minute in the example represented by the curve of FIG. 1 with the finding that upon thermal oxidation, a noticeable rise in resistivity occurred. On the other hand, when samples obtained using boron dopant flow rates in excess of about 600 cc's per minute were subjected to thermal oxidation, the resistivity of the silicon was found to be less following the oxidation than before the oxidation. Additionally, it was noted that a surprisingly large amount of oxide is formed upon the thermal oxidation of polycrystalline silicon containing excess boron beyond the limit of solubility and that the amount of oxide generated per unit silicon consumed is greater in the over-doped samples than in those samples containing boron in amounts below the limit of solubility.

Figure 2:
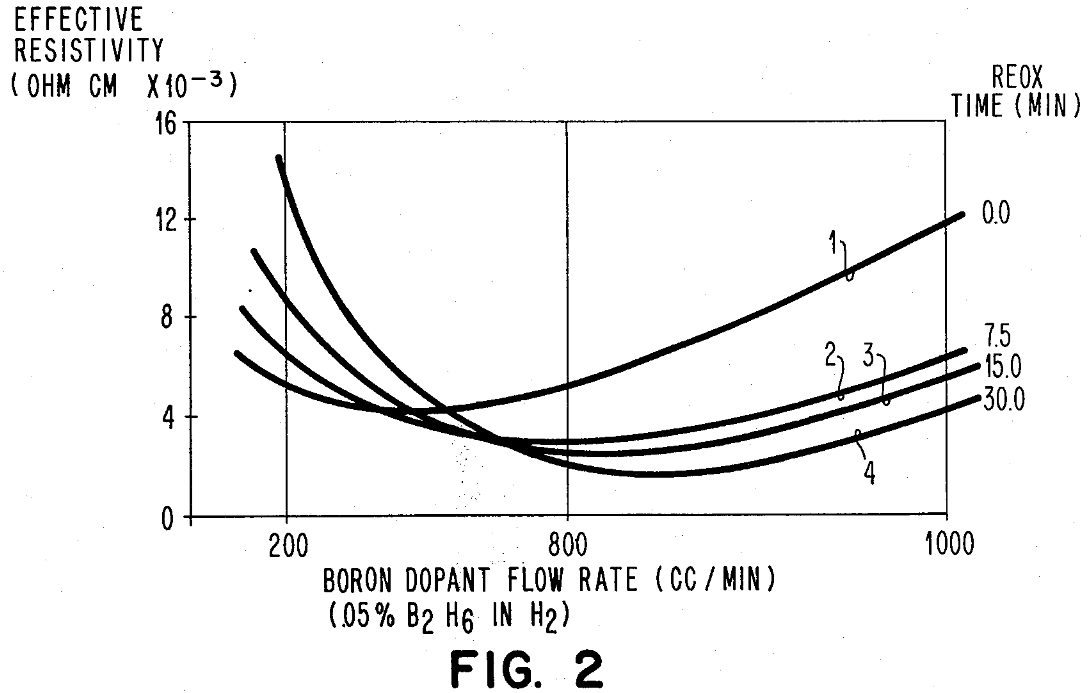
FIG. 2 is a series of superimposed plots showing the interrelationship between effective silicon resistivities, boron flow rates and thermal oxidation times in accordance with the method of the present invention.

The effect whereby resistivity of the silicon is reduced rather than increased by thermal oxidation when the silicon is "overdoped" is demonstrated by the superimposed plots of FIG. 2. Curve 1 of FIG. 2 is derived from resistivity measurements made on a number of samples, each of which is produced in a vertical cylindrical pyrolytic deposition apparatus by the same process with the exception that different boron dopant flow rates were employed. More particularly, three samples using flow rates of 200, 800 and 1600 cc's per minute of boron dopant were made. The other process parameters used were $SiH_4$ (5 percent in $N_2$) —500 cubic centimeters per minute and $H_2$ -65 liters per minute at a temperature of about 930°C and deposition time of 30 minutes. Curve 1 is drawn between the measured resistivity values of these three samples, none of which was subjected to thermal oxidation. Each of the three samples subsequently was subjected to successive thermal oxidation steps. Curve 2 represents the resistivity data obtained when each of the three samples was subjected to 7.5 minutes of thermal oxidation at a temperature of about 1050°C using steam. Similarly, Curves 3 and 4 are drawn from the measured resistivity values of the same three samples when subjected to additional thermal oxidation treatments of 7.5 minutes and 15 minutes, respectively. Thus, Curves 1, 2, 3 and 4 respectively respresent measured resistivity values for the same three samples when subjected to thermal oxidations of 0, 7.5, 15 and 30 minutes respectively.

It will be noted that each of the curves 1-4 exhibits a resistivity minimum and that the resistivity minimum is less for the curves representing the longer thermal oxidation times and that the minimums occur at higher $B_2H_6$ flow rates. For any given integrated circuit semiconductor process, however, wherein the thermal oxidation conditions are predetermined, an appropriate born dopant flow rate can be preselected for depositing the in-situ boron doped polycrystalline silicon so that upon completion of the subsequent thermal oxidation step the resistivity of the silicon is at a minimum value. Minimum resistivity is desired for such applications as doped polycrystalline silicon gate electrodes for field effect transistors, doped polycrystalline field shields, etc. It can be seen by reference to FIG. 2 that boron dopant flow rates of about 700 cc's per minute, 900 cc's per minute, and 1,000 cc's per minute, respectively, should be selected for minimum resistivity if the thermal oxidation times to be used is 7.5, 15, and 30 minutes, respectively. Although the data on which the plots of FIG. 2 are based were derived using specific $SiH_4$, $B_2H_6$, and $H_2$ gaseous reactant flow rates at a specific reaction temperature, it will be obvious to those skilled in the art that similar data can be experimentally obtained in advance using samples produced by different combinations of the in-situ doped deposition process parameters. It also can be seen that the resistivity data may be plotted as a function of the $SiH_4$ mixture flow rate, rather than the $B_2H_6$ mixture flow rate, for constant values of the other deposition parameters.

While this invention has been particularly described with reference to the preferred embodiments thereof, it will be understood by those skilled in the art that the foregoing and other changes in form and details may be made therein without departing from the spirit and scope of the invention.

What is claimed is:

1. The method comprising providing a substrate suitable for the deposition of polycrystalline silicon depositing polycrystalline silicon on said substrate in the presence of boron, the concentration of said boron in the deposited polycrystalline silicon exceeding the limit of solubility of boron in silicon at localized areas within the bulk of said deposited polycrystalline silicon, said concentration being at said limit within said deposited polycrystalline silicon at other than said localized areas, and subsequently oxidizing said deposited polycrystalline silicon at a temperature in the range from about 800°C to about 1150°C.

2. The method defined in claim 1 wherein the ratio of said boron to said silicon is in excess of about 1:18 during said deposition.

3. The method defined in claim 1 wherein $SiH_4$, $B_2H_6$ and $H_2$ are used in depositing said polycrystalline silicon on said substrate at a deposition temperature in the range from about 750°C to about 950°C.

4. The method defined in claim 1 wherein said deposited polycrystalline silicon is oxidized at a temperature and for a time whereby the concentration of said boron at said localized areas is made substantially equal to the concentration of said boron at said other than said localized areas.

5. The method defined in claim 1 wherein said oxidizing is carried out using steam.

* * * * *